INVENTOR
JOHN P. CAMPBELL

United States Patent Office 2,891,740
Patented June 23, 1959

2,891,740

EXTERNAL-FLOW JET FLAP

John P. Campbell, Warwick, Va.

Application June 27, 1957, Serial No. 668,577

5 Claims. (Cl. 244—15)

(Granted under Title 35, U.S. Code (1952), sec. 266)

The invention described herein may be manufactured and used by or for the Government of the United States of America for governmental purposes without the payment of any royalties thereon or therefor.

The present invention relates to an external-flow jet flap, and in particular to an external-flow jet flap in which the flap attached to the wing of an airplane, or the like, has its effectiveness augmented by the exhaust flow from a pod-mounted jet engine mounted generally forward and below the wing.

An object of the present invention is to provide a construction for airplanes with pod-mounted jet engines to augment the lift coefficients obtainable with the presently used trailing edge flap.

Another object of the present invention is to provide a construction which will permit airplanes with pod-mounted jet engines to take off and land at low speeds and with short take-off runs and landing rolls.

A still further object of the present invention is to provide an apparatus in which the above objects are obtained with a minimum of structural changes in the aircraft, including the internal load supporting structure of the wing.

Yet another object is to provide an augmenting arrangement for a flap which may be incorporated into an aircraft in the design stage, or which may be incorporated into existing aircraft with only minor reconstruction thereof.

Figure 1:
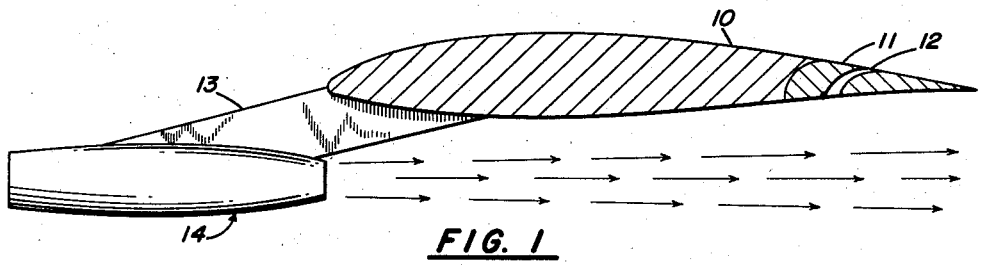
Figure 2:
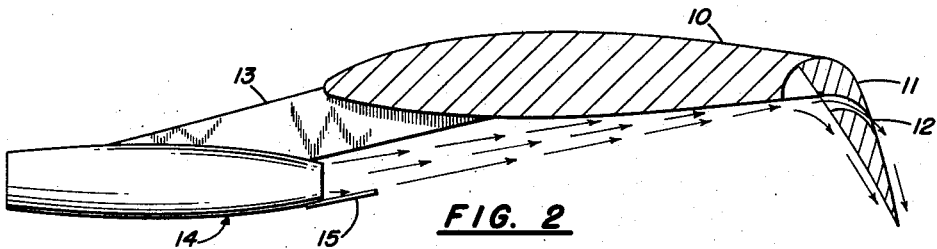
Figure 3:
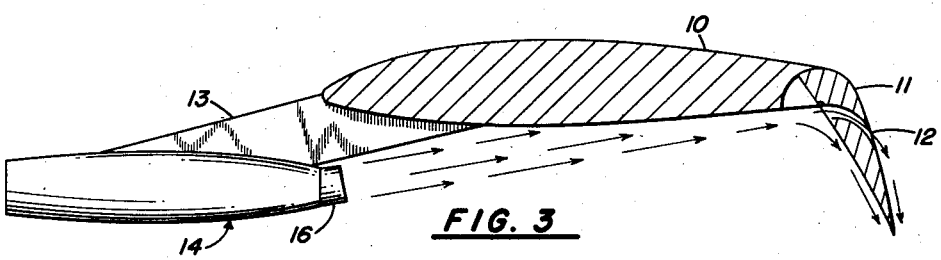
Figure 4:
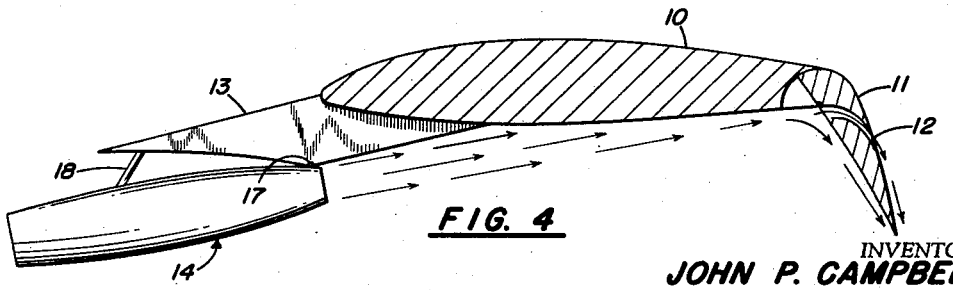

Other objects and many of the attendant advantages of this invention will be readily appreciated as the same becomes better understood by reference to the following detailed description when considered in connection with the accompanying drawings wherein:

Fig. 1 is a cross-sectional view of the wing of an airplane having a pod-mounted jet engine below and forward thereof, with the flap in the undeflected position, Fig. 2 is a view similar to Fig. 1, but with the parts of a first embodiment of the invention in operative position, Fig. 3 is a view similar to Fig. 2 showing a second embodiment of the invention, and Fig. 4 is a view showing a third embodiment of the invention in which the engine is pivotally mounted.

Referring now to the drawings, wherein like reference characters designate like or corresponding parts throughout the several views, there is shown in Fig. 1 an aircraft wing 10 having at its trailing edge a flap 11. Flap 11 preferably has a slot 12 extending therethrough. From the leading edge of the wing 10 a strut 13 extends forwardly and downwardly, and supports a pod-mounted jet engine, generally designated 14. In usual fashion, the jet engine 14 receives air through its front end, and discharges a jet of high velocity, high temperature gases from its rear end, the exhaust jets being represented by the arrows in Fig. 1.

Referring to Fig. 2, it may be seen that the flap 11 is in the deflected position, and in addition, there has been extended from the engine pod 14 a flat plate 15 which intercepts and redirects the exhaust jet from the engine 14, so that the exhaust jet impinges upon the deflected flap 11. The flap 11 then directs the jet downward at approximately the same angle as the angle of deflection of the flap. It will be understood that some flattening of the jet is effected in the initial upward deflection of the jet by the deflector 15, and further flattening occurs when the jet strikes the lower surface of the wing and is deflected downward by the flap 11. It will be understood that plate 15 is movable from a "retracted" position in which it is not struck by the exhaust stream to an "extended" position in which it is struck by the exhaust stream and deflects the stream. Any suitable movement is contemplated for the plate 15 from one position thereof to the other, such as linear, rotational, or a combination of the two. The slot 12, when the flap 11 is in the deflected position, has the top of the lip thereof in line with the lower surface of the wing, this result being obtained by having the hinge axis of the flap 11 on the under surface of the wing 10, and the top of the slot lip terminate at this axis. Although other flaps and/or slot locations could be used, it will be understood that this is the preferred flap configuration.

In Fig. 3, there is shown a second embodiment of the invention, the embodiment of Fig. 3 differing from that of Fig. 2 in that the jet exhaust stream is deflected by a tail pipe 16 mounted for pivotal movement about an axis which is approximately parallel to the airplane transverse axis. Tail pipe 16 is shown in Fig. 3 in the pivoted position. It will be understood that the action of the pivotally mounted tail pipe 16 in directing the exhaust jet upwardly to the deflected flap 11 is substantially the same as that of the plate 15.

In Fig. 4, there is shown a third embodiment of the invention; in this embodiment, the jet engine 14 is pivotally mounted by a hinge means 17 at its rear end to a corresponding part of the strut 13, and the front end of the jet engine 14 may be caused to rotate about the hinge means 17 by an extendable or otherwise movable strut 18 connecting the forward end of the jet engine 14 to a corresponding part of the strut 13.

It will be readily understood that the present invention is such that it may be incorporated into aircraft in the design or proposal stage, or that it is suitable for modification of existing aircraft with only such relatively minor reconstruction as the providing of heat resistant material for the flap and the aft portion of the lower surface of the wing.

Obviously many modifications and variations of the present invention are possible in the light of the above teachings. It is therefore to be understood that within the scope of the appended claims the invention may be practiced otherwise than as specifically described.

What is claimed is:

1. In an aircraft, a wing, a jet engine, a strut extending downwardly from the wing and connected to the jet engine for supporting said engine, a trailing edge flap on said wing rearwardly of said engine, and means to cause the exhaust jet of said jet engine to travel upwardly and strike said flap when said flap is in the deflected position.

2. The apparatus of claim 1, said means comprising a flat plate extendable into a position at the discharge end of said jet engine to intercept and redirect said exhaust jet.

3. The apparatus of claim 1, said means comprising a tail pipe and means pivotally mounting said tail pipe to said engine.

4. The apparatus of claim 1, said means comprising means pivotally mounting said jet engine to said strut and means to cause said jet engine to pivot about said pivotal mounting means.

5. The apparatus of claim 1, said flap hinge axis lying on the undersurface of the wing, and said flap having a slot therethrough, the top of the lip of said slot terminating at the flap hinge axis, whereby the top of the slot lip is in line with the bottom surface of the wing when the flap is in the deflected position.

References Cited in the file of this patent

UNITED STATES PATENTS

| | | |
|---|---|---|
| 1,933,307 | Bolas | Oct. 31, 1933 |
| 2,734,698 | Straayer | Feb. 14, 1956 |